US012757930B2

(12) United States Patent
Graham

(10) Patent No.: US 12,757,930 B2
(45) Date of Patent: Oct. 13, 2026

(54) ADHESIVE SMOKING DETECTOR FOR ENCLOSURES

(71) Applicant: Neicha Graham, Brooklyn, NY (US)

(72) Inventor: Neicha Graham, Brooklyn, NY (US)

( * ) Notice: Subject to any disclaimer, the term of this patent is extended or adjusted under 35 U.S.C. 154(b) by 422 days.

(21) Appl. No.: 18/614,708

(22) Filed: Mar. 24, 2024

(65) Prior Publication Data

US 2025/0295165 A1 Sep. 25, 2025

(51) Int. Cl.

| | |
|---|---|
| ***A24D 3/02*** | (2006.01) |
| ***G01N 15/06*** | (2024.01) |
| ***G01N 21/78*** | (2006.01) |
| ***G01N 31/22*** | (2006.01) |

(52) U.S. Cl.

CPC ....... *A24D 3/0275* (2013.01); *G01N 15/0618* (2013.01); *G01N 21/78* (2013.01); *G01N 21/783* (2013.01); *G01N 31/22* (2013.01)

(58) Field of Classification Search

None

See application file for complete search history.

(56) References Cited

U.S. PATENT DOCUMENTS

| | | | | |
|---|---|---|---|---|
| 5,727,498 | A * | 3/1998 | Hackler ............... | G01N 31/223 116/DIG. 25 |
| 6,792,953 | B2 * | 9/2004 | Lesser ...................... | A24D 3/14 162/162 |
| 8,186,359 | B2 * | 5/2012 | Ademe ................ | A24D 3/0295 209/535 |
| 9,459,151 | B2 * | 10/2016 | Hansmann ............. | G01J 3/501 |
| 2006/0018793 | A1 * | 1/2006 | Hashiba ................. | G01N 31/22 422/86 |

* cited by examiner

*Primary Examiner* — Peter J Macchiarolo
*Assistant Examiner* — Jermaine L Jenkins

(57) ABSTRACT

A device for detecting the presence of past smoking events within an enclosure is provided. The base filter will react to byproducts including tobacco and tetrahydrocannabinol (THC) and will then activate the filter base chemicals to register the smoking events. The device will be facilitated by a protecting case which houses a filter. The design will also interact with the ambient environment and provide ventilation to the filter while monitoring and detecting smoking events.

20 Claims, 4 Drawing Sheets

ADHESIVE SMOKING DETECTOR FOR ENCLOSURES

FIELD OF THE INVENTION

The present invention relates generally to smoke detectors, and more particularly, to adhesive smoke detectors for enclosures which provide a user the ability to economically and efficiently detect past smoking events occurring within an enclosure.

BACKGROUND OF THE INVENTION

Many methods and systems have been used in unsuccessful attempts to monitor and detect unauthorized smoking in certain environments. These systems and methods have not been reliable or effective. Many of the unsuccessful systems are cumbersome, costly and fail to provide a universal common device or kit to use in a variety of spaces to monitor and detect the presence of past smoking events within an enclosure.

As the developing world accepts and adapts to a healthier environment for all and society acknowledges the harmful effects of secondhand smoke and of passive damage to the interiors of enclosures wherein smoking can occur, there is a need to be able to monitor and detect unauthorized smoking events. Quite often, the unique enclosures and the presence of many different people in a space make it difficult to use a universal device for detecting past smoking events. Further, sometimes personnel are alone within a space and unauthorized smoking can occur without anyone else witnessing the smoking.

Extravagant devices and monitoring systems have been unsuccessfully utilized to attempt to detect these unauthorized smoking events. These solutions can be expensive, time consuming, and render the interior space modified in order to accommodate the presence of a detecting device.

Additionally, past attempts have failed to provide a singular device for a user to use in any environment to effectively detect smoke, and without aesthetically affecting the surfaces of the interior of the enclosure.

Accordingly, there is an established need for a smoke detector which solves at least one of the aforementioned problems. Further, there is an established need for a adhesive smoke detector for enclosures which can address providing an effective and economical way of detecting smoking events and not aesthetically affecting the interior areas of an enclosure.

SUMMARY OF THE INVENTION

According to an aspect of the present invention, A device for detecting the presence of past smoking events within an enclosure is provided. The base filter will react to byproducts including tobacco and tetrahydrocannabinol (THC) and will then activate the filter base chemicals to register the smoking events. The device will be facilitated by a protecting case which houses a filter. The design will also interact with the ambient environment and provide ventilation to the filter while monitoring and detecting smoking events.

In another aspect of the present invention, an integrated smoke detection device suitable for use for detecting past smoking events within an enclosure is provided. The device can include a case. The device can also include a housing positionable within the case, the housing arranged to be removable from the case. Additionally, the device can further include a filter configured to be contained within the housing, wherein the filter is configured to change colors upon detection of smoking event occurring within the enclosure and wherein the filter is designed to be replaceable upon completion of a designated monitoring time frame. Further, the device can include a fastening device structured to affix the case to positions within the enclosure to optimally detect past smoking events. Also, the case is configurable to a plurality of enclosure types and the detection of past smoking events is registered on the replaceable filter and wherein the filter changes color upon detection of past smoking events.

In embodiments, the case can include a vented covering, the vented covering configurable to allow air flow within the enclosure to interact with the filter.

In embodiments, the filter can include a plurality of regions wherein chemical compositions are embedded within the filter and the chemical compositions are designed to interact within the enclosure to allow the filter to change colors based on interaction with smoke byproducts and the chemical compositions embedded within the filter.

In embodiments, the filter can include a plurality of filter types. The filter types can include depth filter media consists of fibrous materials that are laid on top of and bonded to each other to interact with smoking byproduct particles, forming a tortuous path throughout their depth. Typical materials for depth media are polypropylene, nylon, and/or polyester. These types of filters offer fairly high dirt-holding capacities and are commonly used for prefiltration and/or the removal of contaminants 1-300 microns.

In embodiments, the filter can include pleated filter media. Pleated medias offer a larger surface area for filtration while still relying on graduated depth, providing higher-dirt holding capacities and longer service life. The common materials for pleated media are polypropylene, microglass, and polyester. Pleated media typically offer higher removal efficiencies than depth filters and are used as either prefilters or final filters (0.2-40 microns) in applications where contaminant removal and/or loading is high.

In embodiments, the filter can include membrane filter media. Membrane medias provide precise filtration by retaining particles based on pore size and a much more narrow pore structure range. These medias are not fibrous but cast and rely more on surface retention than depth for contaminant removal. Common membrane medias are polysulfone, polyethersulfone, Nylon 6,6, and PTFE (polytetrafluoroethylene). Membrane medias offer the highest retention percentages and the smallest particle size removal (0.02-1.0 micron).

In embodiments, the filter can include embedded chemicals which can be dispersed, homogeneously, in a gradient fashion, on the surface, and/or a combination.

In embodiments, the filter can include chemicals which can be interspersed within the filter in a layer positionable within an interior of the filter.

In embodiments, the embedded chemicals can be designed to interact with nicotine, delta-9-tetrahydrocannabinol (THC), Cannabidiol (CBD), and/or other constituent chemicals predominately found in tobacco cigarettes and/or marijuana.

In embodiments, the device can include an electronic communication mechanism wherein the electronic communication mechanism is configured to interact wirelessly with external monitoring platforms wherein the monitoring platforms are structured to register when the case of the device is opened or closed.

In embodiments, the device can include monitoring platforms which can be designed to register a plurality of color changes with the filter after the device has been exposed to an interior of an enclosure for a predetermined period of time and there have been smoking events which have occurred within that enclosure.

In embodiments, the device can include chemicals such as Polycyclic Aromatic Hydrocarbons (PAHs), Tobacco Specific Nitrosamines (TSNAs), and/or P-anisidine.

In embodiments, the device can include an adhesive element.

In embodiments, the device can include circular elements.

In embodiments, the device can include a mobile application, wherein the mobile application is configured to interact with the device wirelessly.

In embodiments, the device and include mobile applications which can be designed to operate on a mobile device and wherein the mobile application is structured to provide real time data from the device.

In embodiments, the device can include integrated devices which can be configured to provide a removable, repositionable, scalable, aesthetically designed, reusable, manually operated, and social responsibility driven implementation, designed to provide a qualitative indication of the past smoking events within the enclosure with incorporation of environmentally conscientious materials and to minimize false positive indications with minimizing interactions with non-conflicting particles.

In embodiments, the device can include depth filter media, pleated filter media, and/or membrane filter media.

In embodiments, the device can include media sensitive to cigarette and tobacco smoke residue left behind after a smoking event has occurred and transferred to the filter by physical contact and/or by ambient air flow over the filter.

In embodiments, the device can include filter includes porosity values of about 10 pores per inch to about 40 pores per inch.

In embodiments, the device can include embedded chemicals within the filterand which can be reagents in common materials and dyes for testing strips, the chemicals including hydrophilic, adhesive, electrode layers relying on a sealing and protection components.

In embodiments, the device can include a protective strip, wherein the protective strip covers active regions of the filter and minimizes exposing the filter to contaminants prior to the device being deployed for use and wherein the protective strip is removed from the filter prior to the device being placed into service.

In embodiments, the device can include filter with embedded chemicals structured to include integrated filter wherein the filter color changes include hue and tone changes wherein the hue and tone are about 80% saturated. In embodiments, the color change can be visually seen and observed by normal observation even when the color change is faint or intense.

These and other objects, features, and advantages of the present invention will become more readily apparent from the attached drawings and the detailed description of the preferred embodiments, which follow.

BRIEF DESCRIPTION OF THE DRAWINGS

The features and advantages of the present invention will be better understood when the Detailed Description of the Preferred Embodiments given below is considered in conjunction with the figures provided.

DETAILED DESCRIPTION

The following detailed description is exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
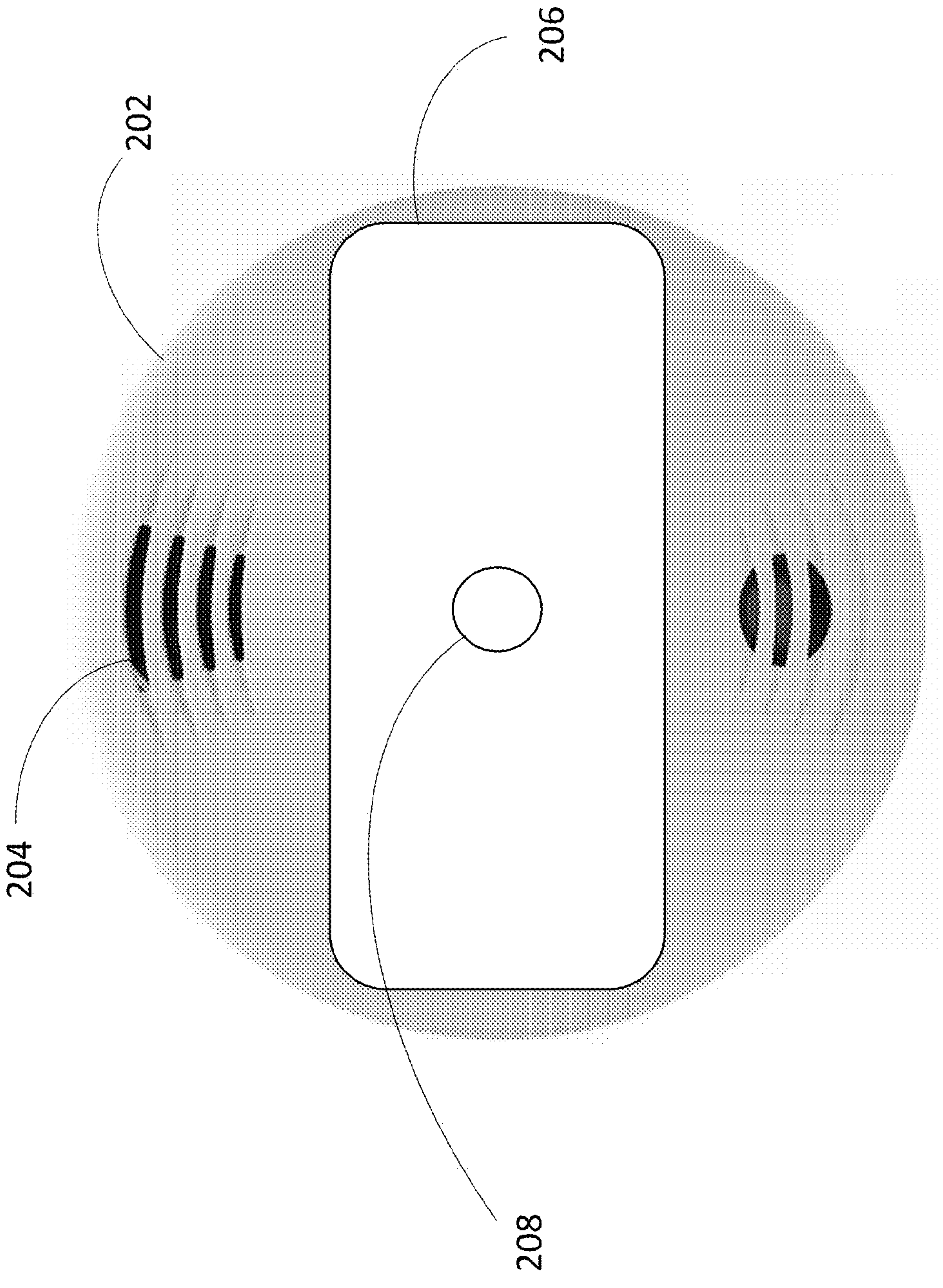
FIG. 1 is a top view of a device in an embodiment of the present invention.

Referring initially to FIG. 1, an embodiment of an integrated smoke detection device 200 is presented. The device 200 can include a case 202. The case 202 can serve to provide tamper proof protection and to allow the device 200 to be positionable within an enclosure in an aesthetically pleasant fashion. The device 200 can include one and/or a plurality of vents 204, wherein the vents 204 can be positionable about the case 202 in order to allow the air within the enclosure to interact with the device 200 in order to detect past smoking events. The device 200 can include an electronic communication mechanism 206 wherein the mechanism 206 can be configured to detect tampering of the device 200 and to wirelessly communicate color changes of a filter 218 (not shown) to remote monitoring platforms. The mechanism 206 can be designed to interact with computer based applications, mobile devices with mobile applications, and/or other computerized operating platforms wherein the color changes of the filter 218 and/or attempts to tamper with the device can be communicated to and with in order to supervise operation of the device remotely. The device 200 can also include a local visual window 208 wherein a local observer can visually observe color changes of the filter 218.

Figure 2:
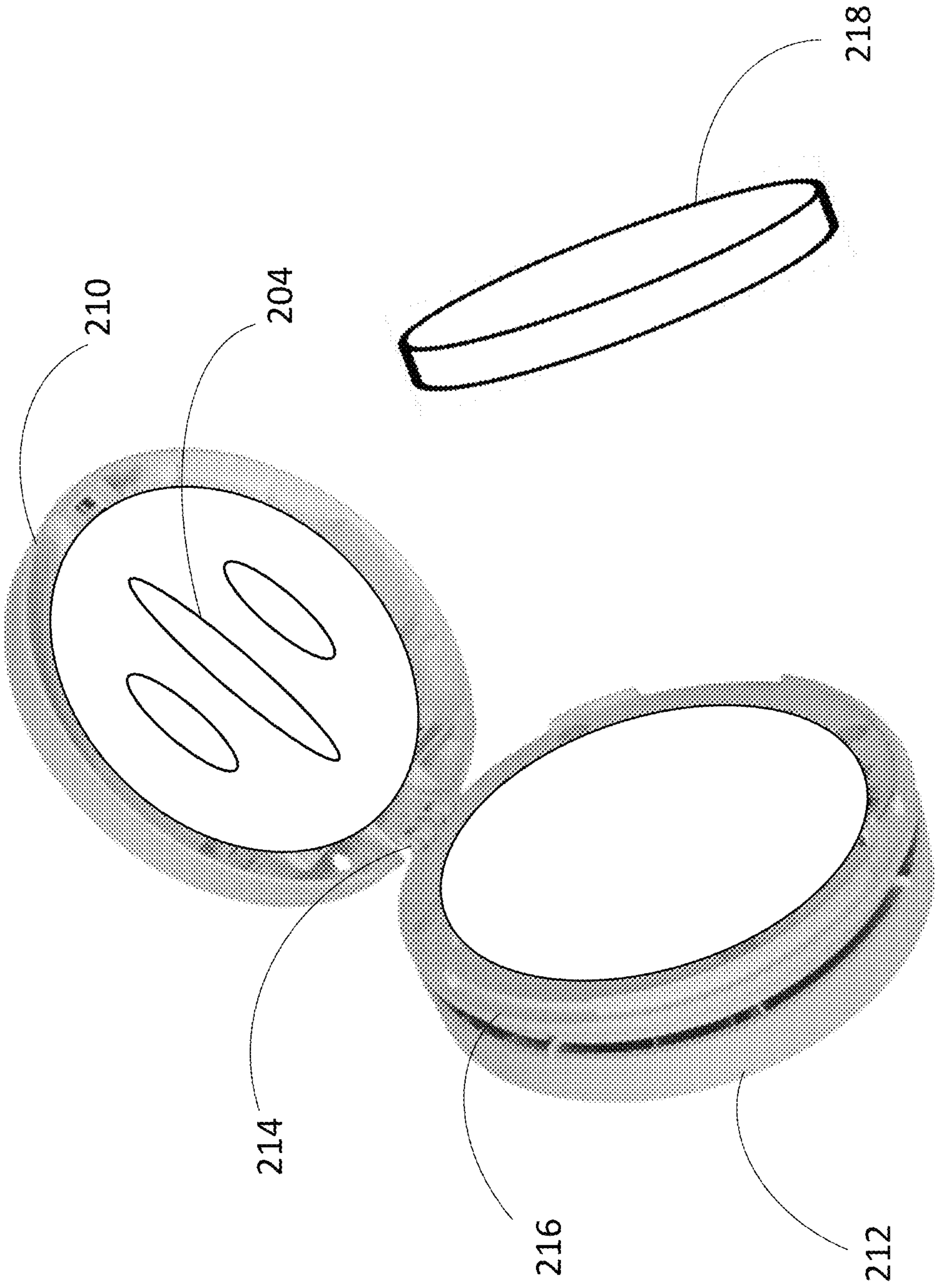
FIG. 2 is a perspective view of a device in an embodiment of the present invention.

Turning to FIG. 2, an embodiment of an integrated smoke detection device 200 in an open position is displayed. The device can include a case top half 210 wherein the top half 210 can include vents 204. The device can also include a case bottom half 212 wherein the bottom half 212 and the top half 210 can be open and closed with a connecting apparatus 214. As shown, the device 200 can be opened and closed by pivoting the top and bottom halves 210 and 212 about the connecting apparatus 214 as in a clamshell fashion. The device 200 can also include a housing 216 wherein the housing is positionable within the case 202 and is enclosed by the case 202 when the top and bottom halves 210 and 212 are in a closed position. Further, the housing 216 can include a space for positioning a filter 218 within the housing 216 and to allow the filter 218 to maintain exposure to ambient air within an enclosure while the device 200 is positioned within the enclosure and the case 202 is in a closed position.

Figure 3:
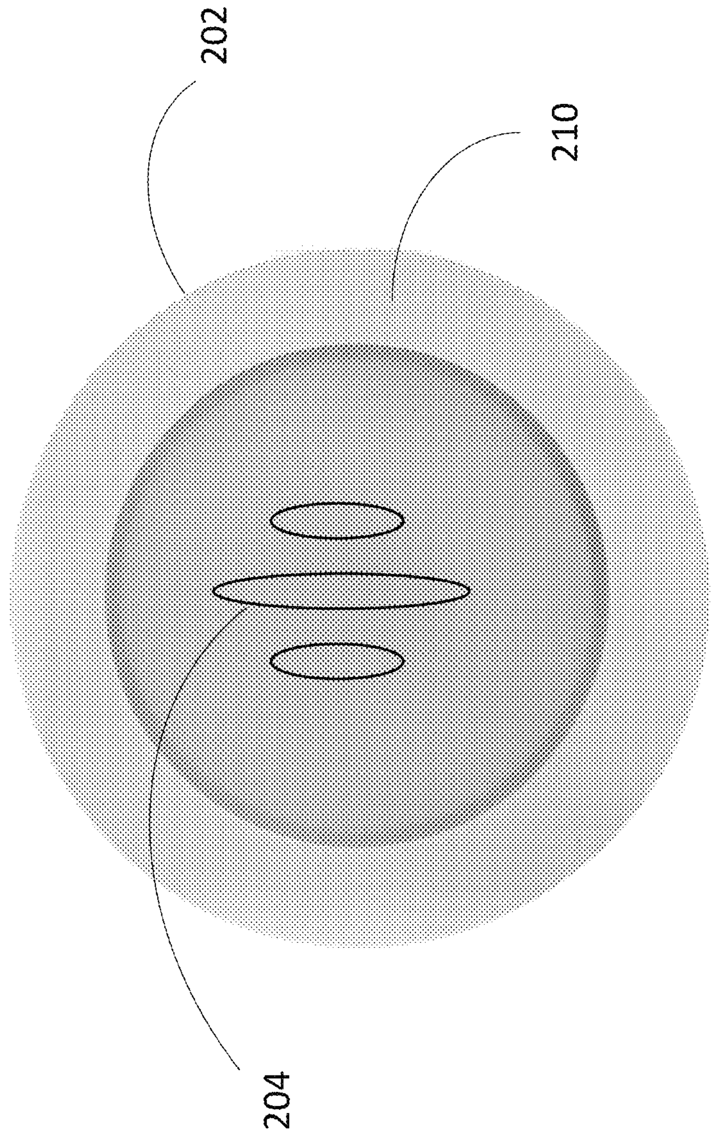
FIG. 3 is a top view of a device in an embodiment of the present invention.

As best seen in FIG. 3, a top view of the device 200 is shown. The device 200 can be in aesthetically pleasing circular shape and the case 202 can be configured to attach to a sun visor within a car or other ergonomical location within an enclosure. The case 202 can include vents 204 within a top half 210 wherein the vents allow the filter 218 to interact with the ambient air within an enclosure and to change colors if past smoking events have occurred.

Figure 4:
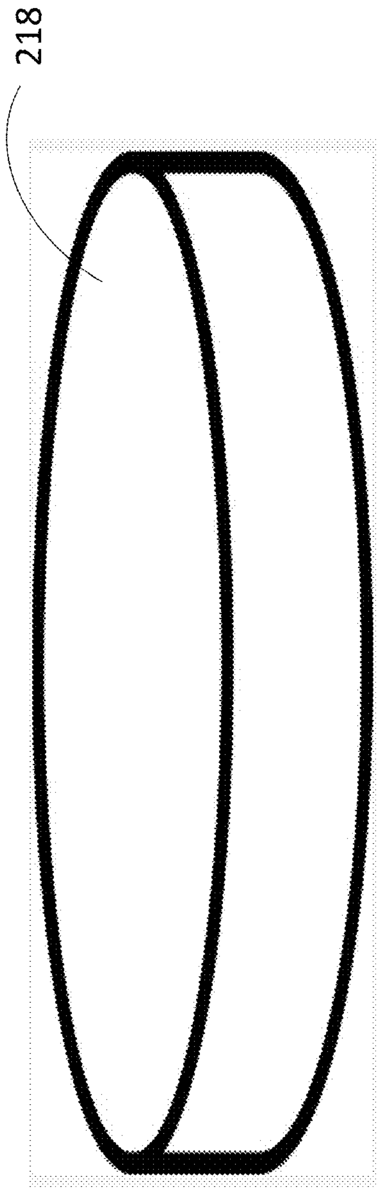
FIG. 4 is a perspective view of a filter in an embodiment of the present invention.

FIG. 4 shows a perspective view of a filter 218. The filter 218 can be round in shape and configured to change color upon detection of past smoking events. The filter can include embedded chemicals wherein the embedded chemicals are designed to change colors upon interaction with smoking event by products emitted when smoking cigarettes and/or marijuana. The embedded chemicals can be Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

The present invention has been described with reference to the preferred embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

What is claimed is:

1. An integrated smoke detection device suitable for use for detecting past smoking events within an enclosure, the device comprising:

a case;

a housing positionable within the case, the housing arranged to be removable from the case;

a filter configured to be contained within the housing, wherein the filter is configured to change colors upon detection of smoking event occurring within the enclosure and wherein the filter is designed to be replaceable upon completion of a designated monitoring time frame;

a fastening device structured to affix the case to positions within the enclosure to optimally detect past smoking events; and wherein the case is configurable to a plurality of enclosure types and the detection of past smoking events is registered on the replaceable filter and wherein the filter changes color upon detection of past smoking events.

2. The device as recited in claim 1 wherein the case includes a vented covering, the vented covering configurable to allow air flow within the enclosure to interact with the filter.

3. The device as recited in claim 1 wherein the filter includes a plurality of regions wherein chemical compositions are embedded within the filter and the chemical compositions are designed to interact with air within the enclosure to allow the filter to change colors based on interaction with smoke byproduct chemicals and the chemical compositions embedded within the filter.

4. The device as recited in claim 1 comprising an electronic communication mechanism wherein the electronic mechanism is configured to interact wirelessly with external monitoring platforms wherein the monitoring platforms are structured to register when the case of the device is opened and closed.

5. The device as recited in claim 4 wherein the monitoring platforms are designed to register a plurality the color changes of the filter after the device has been exposed to an interior of the enclosure for a predetermined period of time.

6. The device as recited in claim 1 wherein the filter includes chemicals embedded in the filter, wherein the embedded chemicals include Polycyclic Aromatic Hydrocarbons (PAHs), Tobacco Specific Nitrosamines (TSNAs), and/or P-ansidine.

7. The device as recited in claim 6 wherein the embedded chemicals in the filter are dispersed homogeneously throughout the filter.

8. The device as recited in claim 6 wherein the embedded chemicals in the filter are dispersed throughout the filter in a gradient fashion.

9. The device as recited in claim 6 wherein the embedded chemicals in the filter are interspersed within the filter in a layer positionable within an interior of the filter, the embedded chemicals within the filter are reagents in common materials and dyes for testing strips, the chemicals including hydrophilic, adhesive, electrode layers relying on a sealing and protection components.

10. The device as recited in claim 6 wherein the embedded chemicals are designed to interact with nicotine, Delta-9-tetrahydrocannabinol (THC), Cannabidiol (CBD), and/or other constituent chemicals predominantly found in tobacco cigarettes and/or marijuana.

11. The device as recited in claim 1 comprising an adhesive element.

12. The device as recited in claim 1 comprising circular elements.

13. The device as recited in claim 1 comprising a mobile application, wherein the mobile application is configured to interact with the device wirelessly.

14. The device as recited in claim 13 wherein the mobile application is designed to operate on a mobile device and wherein the mobile application is structured to provide real time data from the device.

15. The device as recited in claim 1 wherein the integrated smoke detection device is configured to provide a removable, repositionable, scalable, aesthetically designed, reusable, manually operated, and social responsibility driven implementation, designed to provide a qualitative indication of the past smoking events within the enclosure with incorporation of environmentally conscientious materials and to minimize false positive indications with minimizing interactions with non-conflicting particles.

16. The device as recited in claim 1 wherein the filter includes depth filter media, pleated filter media, and/or membrane filter media.

17. The device as recited in claim 1 wherein the filter includes media sensitive to cigarette and tobacco smoke residue left behind after the smoking event has occurred and transferred to the filter by physical contact and/or by ambient air flow over the filter.

18. The device as recited in claim 1 wherein the filter includes porosity values of about 10 pores per inch to about 40 pores per inch.

19. The device as recited in claim 1 wherein the filter includes a protective strip, wherein the protective strip covers active regions of the filter and minimizes exposing the filter to contaminants prior to the device being deployed for use and wherein the protective strip is removed from the filter prior to the device being placed into service.

20. The device as recited in claim 1 wherein the filter color changes include hue and tone changes wherein the hue and tone are about 80% saturated.

* * * * *